(12) United States Patent
Wasiq et al.

(10) Patent No.: US 9,813,450 B1
(45) Date of Patent: Nov. 7, 2017

(54) METADATA-BASED VERIFICATION OF ARTIFACT QUALITY POLICY COMPLIANCE

(71) Applicant: Amazon Technologies, Inc., Seattle, WA (US)

(72) Inventors: Muhammad Wasiq, Vancouver (CA); Nima Sharifi Mehr, Vancouver (CA)

(73) Assignee: Amazon Technologies, Inc., Reno, NV (US)

( * ) Notice: Subject to any disclaimer, the term of this patent is extended or adjusted under 35 U.S.C. 154(b) by 258 days.

(21) Appl. No.: 14/623,414

(22) Filed: Feb. 16, 2015

(51) Int. Cl.
*G06F 17/00* (2006.01)
*H04L 29/06* (2006.01)

(52) U.S. Cl.
CPC .................... *H04L 63/20* (2013.01)

(58) Field of Classification Search
CPC ........................................ H04L 63/20
USPC ............................................................ 726/1
See application file for complete search history.

(56) References Cited

U.S. PATENT DOCUMENTS

| | | | |
|---|---|---|---|
| 5,860,011 A | 1/1999 | Kolawa et al. | |
| 8,302,087 B2 | 10/2012 | Ayachitula et al. | |
| 8,572,550 B2 | 10/2013 | Fox et al. | |
| 8,612,936 B2 | 12/2013 | Fox et al. | |
| 8,627,287 B2 | 1/2014 | Fanning et al. | |
| 8,856,725 B1 | 10/2014 | Anderson et al. | |
| 2009/0055804 A1 | 2/2009 | Blaschek et al. | |
| 2009/0144698 A1* | 6/2009 | Fanning | G06F 8/75 717/120 |
| 2011/0161938 A1 | 6/2011 | Marum et al. | |
| 2011/0283260 A1 | 11/2011 | Bucuvalas | |
| 2012/0311534 A1* | 12/2012 | Fox | G06F 8/71 717/120 |
| 2014/0304767 A1 | 10/2014 | Bezilla et al. | |

FOREIGN PATENT DOCUMENTS

CN 101017458 8/2007

* cited by examiner

*Primary Examiner* — Teshome Hailu
(74) *Attorney, Agent, or Firm* — Robert C. Kowert; Meyertons, Hood, Kivlin, Kowert & Goetzel, P.C.

(57) ABSTRACT

An automated quality compliance verifier QCV identifies a quality control policy to be implemented for artifacts in a repository. The QCV determines one or more artifact metadata categories, including at least one category indicating an activity status (such as recent or ongoing use) of the artifacts. Metadata entries for at least the activity status category are obtained for a first and a second artifact. Based on an analysis of the metadata entries, the QCV assigns a higher priority to a first policy violation detection operation (PVDO) for the first artifact than to a second PVDO for the second artifact. Based on a result of the first PVDO, the QCV initiates one or more responsive actions.

20 Claims, 9 Drawing Sheets

METADATA-BASED VERIFICATION OF ARTIFACT QUALITY POLICY COMPLIANCE

BACKGROUND

Many large enterprises employ thousands of employees distributed around numerous facilities distributed throughout the world. As part of normal business operations, numerous types of persistent artifacts or objects may be generated in different parts of the enterprise, and stored in corresponding persistent repositories. At enterprises that implement network-accessible services (such as various types of cloud-based computing services and/or storage services), for example, such artifacts may include source code files used for the implementation of different services, account records, network configuration records, server or host configuration records and the like. In some cases, hundreds of thousands of such artifacts, or even millions of such artifacts may eventually reside in various artifact repositories as new projects are implemented to support various business goals.

In at least some enterprises, information security departments may be established, responsible for ensuring that the artifacts meet various security-related criteria. For example, as more and more network-based attacks (such as denial-of-service or DOS attacks, malware-based attacks and the like) are directed to business entities, it has become increasingly important to ensure that the software packages being used at an enterprise do not use out-of-date or unpatched networking code that may be vulnerable to such attacks. Similarly, an information security department may be charged with ensuring that the user accounts that could potentially be used to access various resources of the enterprise meet certain policy-defined criteria—e.g., that bogus accounts are not created and provided with permissions to sensitive business data, that secure passwords are used, or that passwords are changed periodically.

A number of different techniques have conventionally been used to try to enforce artifact security and quality objectives. For example, the text of all the files of a given source code repository may be scanned periodically to check for the use of vulnerable libraries or algorithms, and corrective actions may be triggered for those files that are tagged as policy violators. In some cases, because of the large numbers of artifacts involved, the policy violation detection operations as well as the corrective actions may require non-trivial amounts of resources and/or time. Furthermore, at least some of the artifacts that are flagged as policy violators using such techniques may be "false positives" that do not necessarily require corrective actions to be taken.

Figure 1:
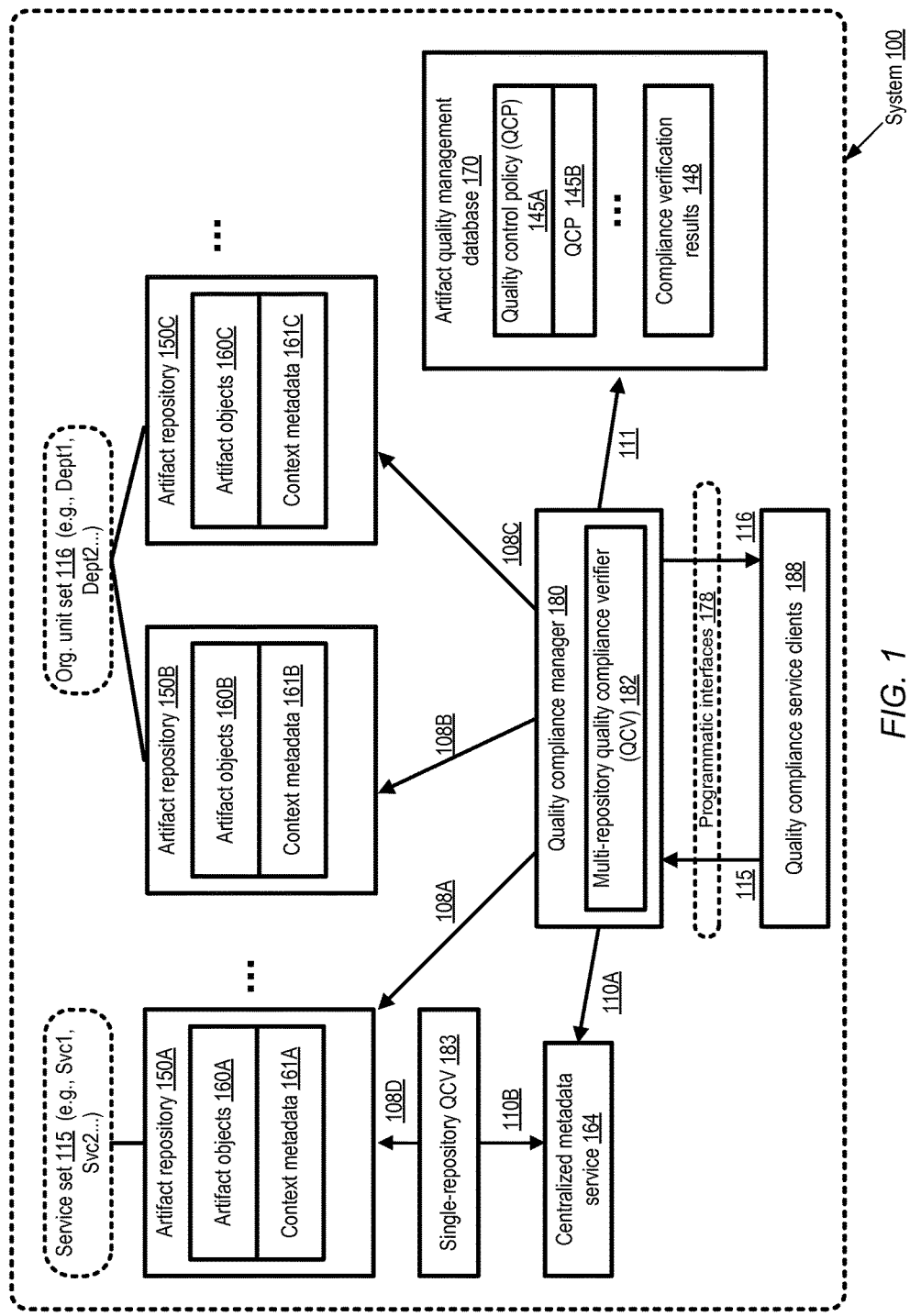
FIG. 1 illustrates an example system environment in which context metadata may be used to optimize the implementation of artifact quality control policies, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing metadata-based optimizations of the automated enforcement of quality policies for numerous types of artifacts that may be created at large-scale enterprises are described. A large enterprise today may employ thousands of workers distributed at various locations around the world to implement various aspects of the enterprise's business goals. For example, some enterprises may implement a variety of network-accessible services that are intended to be used by various employees (e.g., using internal networks of the enterprise) and/or external customers (e.g., via the Internet). Such services may require the development of complex software products by the enterprise's software engineering teams, often comprising tens of thousands of individual source code files and millions of lines of code. The software developed by the various organizational units of the enterprise may represent a growing collection of artifacts over time. The enterprise owners may wish to enforce various quality control policies over the software, e.g., policies that ensure that modules or algorithms that may expose the services to network-based attacks are not retained in the software, that algorithms known to provide sub-optimal performance are not used, or that one or more standards for structuring software code are met by all the software. In addition to software artifacts, a large enterprise with one or more business facilities with respective sets of computing devices may also maintain a number of other types of artifacts in various databases or repositories, such as user/group account information records, network configuration information records, data center or facility inventory records including host location/configuration records, and the like. For each such type of artifact, a corresponding set of quality control criteria may apply. Enterprises that do not utilize network-based services extensively, and do not necessarily generate a large amount of in-house software programs, may nevertheless also generate various types of business artifacts which may need to meet quality requirements.

Different groups of artifacts may be stored in respective persistent repositories of the enterprise in some embodiments—e.g., source code files may be stored in one or more source code repositories, account information may be stored in an identity and access management (IAM) system database, inventory records and host configuration records may be stored in a resource management database, and so on. In some embodiments, artifact repositories may be set up based on the enterprise's organizational hierarchy—e.g., different software development departments may have their own source code repositories. In other embodiments, respective artifact repositories may be maintained for different types of functions, services or product lines, which may not necessarily correlate fully with the enterprise's organizational hierarchy.

In some embodiments, an enterprise may include one or more quality enforcement organization units, such as an information security department or a quality control department, responsible enforcing quality policies enterprise-wide using a variety of techniques. In one embodiment, for example, with respect to checking a particular type of artifact, a corresponding list of quality policy violation definitions or "black-list" may be generated, and individual artifacts of that type may be searched or analyzed (e.g., using text scans) in an automated manner to determine whether their contents match any of the violation definitions. Other types of policy violation identification techniques may be used in some embodiments, such as completeness analysis (to ensure that all the elements of a given artifact are populated with valid entries), duplication detection, ownership validation, and so on. Artifacts that are identified as violators of quality policies may require additional responsive actions to be taken in some cases—e.g., further automated analysis operations may be scheduled for some violating artifacts prior to their removal from their repositories, and/or alerts/warnings may be sent to the individuals or groups responsible for the violating artifacts.

At large artifact collections which may each include thousands or millions of artifacts, quality policy violation detection may consume substantial resources (e.g., computational resources, memory resources and the like) in various embodiments. Each pass through such a collection may potentially result in the identification of numerous (e.g., hundreds or thousands of) violating artifacts in some scenarios. Furthermore, from a practical perspective, the presence of some of the artifacts identified as policy violators may have little or no negative impact on the business activities of the enterprise. For example, it may be the case that a particular source code file "A.cpp" includes a call of a potentially vulnerable or sub-optimal library routine "X1( )" within a function "A-Func1( )". If the function "X1( )" is included in a black-list of policy violations, A.cpp may be flagged as a policy violator artifact. However, it may be the case that "A-Func1( )" is never actually invoked at run-time from any other module or function, and as a result the presence of the suspect call to X1 has no impact in practice on the business operations being performed using A.cpp. Identifying such "false positives"—i.e., cases where an artifact appears to be violating a quality policy, but does not necessarily require responsive actions to be taken—may be extremely difficult for various types of artifacts in some embodiments.

However, in at least some embodiments, it may be possible to use metadata entries associated with the artifacts to make reasonable judgments about which of the artifacts are more likely to be in use, and for which responsive actions are therefore more appropriate if apparent policy violations are found. It may be possible, in the above example regarding A.cpp, to determine with 80% certainty (e.g., using e-mail history metadata or deployment configuration metadata information as discussed below) that the code included in A.cpp is not actually in active or production use. Accordingly, responsive actions taken to the detection of the policy violation represented by the call to X1( ) may be de-prioritized relative to responsive actions for other possible violations. Entries corresponding to a number of different metadata categories which can be used to make such prioritization decisions may be available in some embodiments as described below in further detail. Using the metadata, in various embodiments either the policy violation detection operations (e.g., text scans for blacklist entries), the responsive operations to policy violations (e.g., automated notifications of the violations, removal of the violating artifacts from the repository, or additional analysis of the violators), or both, may be prioritized in such a way that the resources consumed for quality policy enforcement are reduced. In some cases, as described below, some low-priority violation detection operations (or responsive actions to detected violations) may even be skipped entirely, e.g., if the likely impact of the corresponding violations is estimated to be below a threshold.

In at least one embodiment, one or more automated quality compliance verifiers (QCVs) may be used for enforcing quality control policies (QCPs) with the help of artifact metadata. For a given set of artifacts stored in a particular repository, a QCV may identify one or more metadata categories to be used to guide and optimize the QCV's quality enforcement actions. The metadata of interest may include, for example, e-mail list contents, artifact ownership information, deployment target resources, change histories, and so on, at least some of which indicate an activity status (e.g., whether the artifact is currently in, has recently been in, or is soon likely to be in, active use or production use). In general, different categories of the metadata associated with a given type of artifact may be available from different sources within the enterprise—e.g., e-mail related metadata may be available from an e-mail management system, deployment resource information may be available from a deployment database, and so on. The QCV may obtain the appropriate permissions to view the relevant metadata programmatically from the different metadata sources in at least some embodiments, and then programmatically obtain the metadata entries corresponding to various artifacts as needed.

A QCV may assign, based at least in part on an analysis of respective metadata entries of different artifacts, respective priorities to policy violation detection operations (PVDOs) (such as scans) directed to different artifacts. For example, consider a scenario in which a repository comprises artifacts A1 and A2, for which respective metadata entry sets {M1} and {M2} are accessible to the QCV. After examining {M1} and {M2}, the QCV may assign a PVDO directed to A1 a higher priority than a PVDO directed to A2.

In some implementations, the analysis of the metadata may precede the implementation of the PVDOs, while in other cases the metadata may be analyzed after the PVDOs are performed, and the results of the metadata analysis may be used to prioritize the responses to the PVDOs. These two alternative approaches to QCP enforcement may be referred to herein as "filtering-first" (in the case where metadata is used to filter or prioritize the PVDOs to be performed) and "violation-detection-first" (in the case where the PVDOs are performed first and the metadata is then used to prioritize the responses to detected violations). In at least one embodiment, the relative costs of the metadata analysis and the PVDOs may be used to determine which of the two approaches to use, as discussed below in the context of FIG. 7. In the filtering-first approach, in various embodiments, the high-priority PVDOs may be performed first (and in some cases low priority PVDOs may not be performed at all). If a policy violation is detected by a high-priority PVDO, the corresponding responsive action may be taken. For some lower-priority PVDOs, in at least some scenarios responsive actions may not be taken in the filtering-first approach. In the violation-detection-first approach, responsive actions may be implemented first for the high-priority PVDOs in which violations were detected, and in some cases (e.g., depending on the resources consumed in responding to the high priority violations) no responsive actions may be implemented for the violations found using low-priority PVDOs. In some embodiments, the QCV may be responsible for assigning priorities associated with policy violation detection and/or corresponding responsive actions, but not necessarily for implementing the responsive actions—that is, other entities (such as owners of the violating artifacts or the repository at which policy violations are detected) may perform the responsive actions.

In at least some embodiments, respective importance scores may be assigned to various metadata categories, indicative of the relative predictive utility of the categories with respect to the activity levels of the artifacts. For example, it may be the case that metadata categories Cat1, Cat2, and Cat3 may each be used to predict whether a given source code file is currently being used for production applications (e.g., applications that are used by external customers of the enterprise), but Cat1 may be a better predictor of current production use than Cat2, and Cat3 may be a better predictor than Cat2. In such a scenario, an importance score of 8 (e.g., on a scale of 1 to 10) may be assigned to Cat1 metadata, a score of 5 may be assigned to Cat2, and a score of 2 may be assigned to Cat3. In various embodiments, importance scores associated with several different metadata categories may be aggregated or combined by a QCV to assist in the prioritization of PVDOs or actions responsive to apparent policy violations. In at least one embodiment, the QCV may assign such scores, e.g., based on trend analysis of the predictive contributions of the different metadata categories. In some embodiments, the QCV may include a learning engine that employs various machine learning techniques to assign and/or refine the importance scores. Users of the QCV may assign the scores programmatically, e.g., via interfaces such as APIs (application programming interfaces) or consoles provided by the quality management service(s) associated with the repositories.

According to one embodiment, a variety of single-predicate rules and/or multi-predicate rules, each defined in terms of entry values of one or more metadata categories, may be used by the QCV to assign priorities to the PVDOs of various artifacts. For example, one single-predicate rule may represent the logical equivalent of "If the most recent change applied to artifact A1 occurred less than two weeks ago, assign a priority P1 to A1's PVDO". In this first example, modification time metadata is being used for assigning PVDO priorities. An example multi-predicate rule may be the logical equivalent of "If an e-mail list associated with artifact A2 was used within the previous week, or if a service log entry indicating an execution of a module of artifact A2 has a log timestamp within the previous month, then assign a priority P2 to A2's PVDO". In this second example, two categories of metadata are being used to assign PVDO priorities: e-mail lists and service log entries. In some embodiments, rules may also be used to assign importance scores to be used to guide prioritization—e.g., one rule may have a different importance score associated with it than another. Various combinations of such rules and/or importance scores may be used in different embodiments. In at least some embodiments, users or clients of the quality control infrastructure (e.g., system administrators) may be provided tools such rule generation wizards, consoles, APIs, GUIs or command-line tools to indicate such prioritization rules.

In some embodiments, a QCV may perform its policy enforcement operations at a given artifact repository in accordance with a pre-determined schedule (e.g., once every day, or in conjunction with each software build). In addition to or instead of pre-scheduled policy enforcement iterations, in at least some embodiments quality policy enforcement checks may be performed on-demand or in response to various triggering conditions or events (such as the detection of a new software vulnerability, or the deployment of a new version of software). In some embodiments, multiple QCVs may be established for different repositories within a large-scale computing environment, e.g., at the department level or the service level. In other embodiments, a single QCV may be used for multiple repositories.

Example System Environment

FIG. 1 illustrates an example system environment in which context metadata may be used to optimize the implementation of artifact quality control policies, according to at least some embodiments. As shown, system 100 may comprise a plurality of artifact repositories 150 (e.g., 150A, 150B and 150C) used for storing a variety of business objects generated at an enterprise, such as source code files/libraries/packages, configuration records (such as host/server configuration records or networking configuration records), account records (e.g., records identifying customers of one or more services or products) and the like. In some embodiments, system 100 may include resources of a provider network. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks herein. Provider networks may also be referred to as "public cloud" environments. Some or all of the repositories 150 may be set up specifically to support one or more of the network-accessible services implemented at a provider network: for example, in the embodiment depicted in FIG. 1, repository 150A is associated with a service set 115 comprising Svc1, Svc2, and so on. Other repositories 150 may be more closely tied to an organizational hierarchy of the enterprise—e.g., repositories 150B and 150B are both associated with a set of organizational units 116 which includes departments Dept1 and Dept2. Multiple repositories 150 may be used for the artifacts of a given service or a given organizational unit in at least some embodiments.

Some repositories may be affiliated both with a service set and with a department set.

Each repository may include numerous artifact objects 160 (e.g., objects 160A in repository 150A, objects 160B in repository 150B, and objects 160C in repository 150C). In the depicted embodiment, entries of one or more categories of context metadata 161 (e.g., information that can be used, at least in principle, to detect or predict the activity level or production use of the artifacts) may be available for the artifacts stored in the various repositories 150. For example, context metadata 161A may be available for artifacts of repository 150A, context metadata 161B for artifacts of repository 150B, and context metadata 161C for artifacts of repository 150C. Examples of context metadata that may be utilized in various embodiments are described in further detail below with respect to FIG. 4. In different embodiments, some or all of the context metadata entries may be stored either within the repositories 150 themselves, or in external databases. In some embodiments, some types of context metadata may be available from one or more centralized metadata services 164 of system 100, such as an e-mail management service or a deployment resource mapping service.

A number of different quality control policies (QCPs) 145, such as 145A and 145B, may be applied or enforced for the artifacts stored in various repositories 150 in the depicted embodiment by a quality control service of system 100. The quality control service may, for example, include a quality compliance manager 180 comprising one or more computing devices which is responsible for supporting QCPs 145 stored in an artifact quality management database 170. Some or all of the computing devices of the quality compliance manager 180 may be employed as a multi-repository quality compliance verifier 182 in the depicted embodiment. In at least some embodiments, one or more of the repositories 150 may have their own single-repository QCVs (such as QCV 183 of repository 150A) configured. In one embodiment, all the repositories 150 may have respective single-repository QCVs configured, and multi-repository QCVs may not be required. Each single-repository or multi-repository QCV may be responsible for performing policy violation detection operations (PVDOs) to enforce one or more QCPs 145 on at least some the artifacts stored in one or more of repositories 150 in the depicted embodiment. Each QCP 145 may include a number of different constituent elements in various embodiments, as described in further detail below with respect to FIG. 3, such as an indication of the definitions of policy violations, the methodology to be used to detect the violations, and so on.

A given QCV 182 or 183 may determine, for the set of artifacts whose quality is to be checked by the QCV, a set of metadata categories to be used to optimize the PVDOs (and/or responses to PVDO results) for the set of artifacts in the depicted embodiment. In some cases, the QCPs 145 may include a list of relevant metadata categories and/or associated rules to be used to prioritize the PVDOs. The QCV may programmatically obtain entries corresponding to selected metadata categories for at least some of the artifacts. Some metadata entries may be obtained from the repositories (as indicated by arrows 108A, 108B, 108C and 108D). Other metadata entries may be obtained from centralized metadata services such as 164, as indicated by arrows 110A and 110B. Based on an analysis of the collected metadata, a given QCV may be able to prioritize PVDOs for the different artifacts for which the QCV is responsible. In some implementations or for certain repositories 150, the metadata analysis results may be performed first (i.e., before the PVDOs) in an approach referred to herein as "filtering-first" quality policy enforcement. The metadata may be used to prune, filter, or prioritize the artifacts on which the PVDOs are to be performed. In other implementations or for other repositories, a "violation-detection-first" approach may be used, in which PVDOs are performed on all the artifacts, and the metadata is analyzed later to prioritize the responsive actions to be taken for those artifacts that appear to have violated the QCPs. In at least some embodiments, the compliance verification results 148 of the PVDOs and/or records of responsive actions implemented as a result of violations may be stored in the artifact quality management database 170. As mentioned above, in at least one embodiment a QCV may use the metadata to assign relative priorities to different artifacts' potential violations, but any actions taken in response to violations may be performed by other entities.

In some embodiments, one or more programmatic interfaces 178 (e.g. web-based consoles/tools/wizards, APIs, GUIs or command-line tools) may be implemented by the quality compliance manager 180 for interactions with clients or users 188 of the quality compliance service. Using such interfaces as indicated by arrow 115, in some embodiments, the clients 188 may assign relative importance scores to different metadata categories (e.g., indicative of the relative expected usefulness of the metadata for predicting whether the corresponding artifacts are in production use or are actively being used) or define various single-predicate or multi-predicate rules for prioritizing PVDOs. In at least some embodiments, one or more results of the quality verification analysis may be provided to the clients 188 using programmatic interfaces 178, as indicated by arrow 116. An example of a web-based interface 178 which may be used for generating prioritization rules is provided in FIG. 6 and discussed below. It is noted that various elements of the quality compliance service, such as the quality compliance manager 180, the database 170, and/or the individual QCVs 182 or 182 may each be implemented in a distributed manner in at least some embodiments, e.g., using a plurality of computing devices linked to each other over a network.

Using the metadata-guided approach discussed above, the various QCVs may be able to reduce the resources used for QCP enforcement in some embodiments, e.g., by reducing the number of PVDOs performed, and/or by reducing the number of actions taken in response to potential QCP violations. Furthermore, the use of the metadata for prioritizing operations based on predicted/estimated activity levels of the artifacts may also help in reducing the response times for those policy violations that are more likely to have negative impacts on the services and organizational units of system 100. In various embodiments, the costs associated with false positive identifications of QCP violations may be substantially reduced using the techniques described herein, and may consequently lead to a greater buy-in of the QCP enforcement overhead in various parts of the enterprise.

Example Artifact Repository

Figure 2:
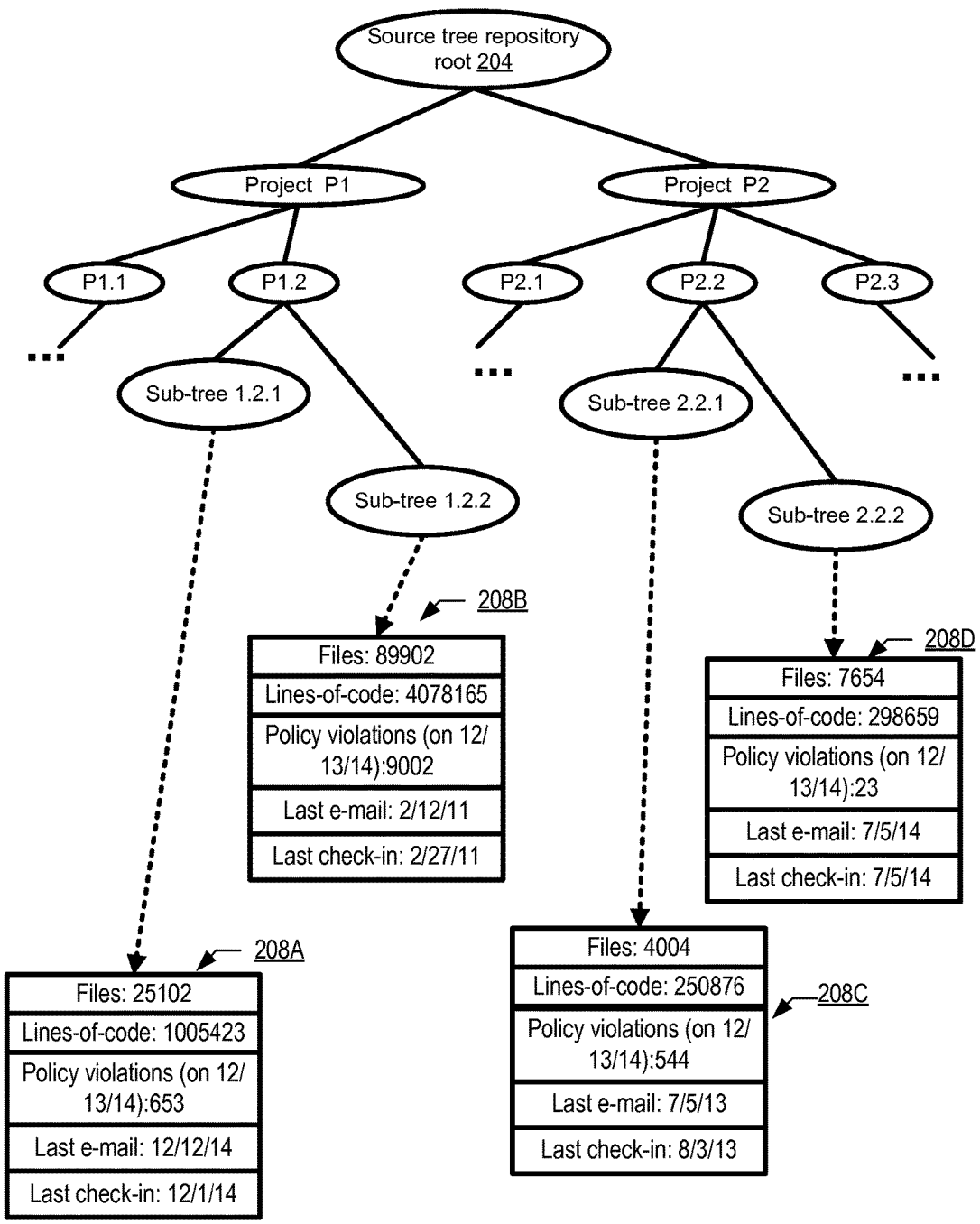
FIG. 2 illustrates an example of a source code repository for which source file metadata may be used to distinguish the activity levels associated with different sub-trees and prioritize responses to policy violations, according to at least some embodiments.

As mentioned earlier, source code repositories for various computer programs implemented and/or used by the employees of an enterprise may represent one example of the kind of artifact repositories for which metadata-guided quality policy enforcement may be implemented in some embodiments. FIG. 2 illustrates an example of a source code repository for which source file metadata may be used to distinguish the activity levels associated with different sub-trees and prioritize responses to policy violations, according to at least some embodiments. As shown, the repository's objects (source code files, executable library files and the like) may be organized as a tree rooted at repository root node 204. Underneath the root node 204, respective sub-trees for the code pertaining to different projects such as P1 and P2 may be established in the depicted embodiment. A given project's files may further be partitioned based on sub-project names, such as P1.1 and P1.2 (sub-projects of P1) and P2.1, P2.2 and P2.3 (sub-projects of P2). Each sub-project in turn may comprise one or more respective sub-trees such as 1.2.1 and 1.2.2 (sub-trees of project P1.2) or 2.2.1 and 2.2.2 (sub-trees of project P2.2).

In general, especially in environments where sophisticated services and applications are developed by hundreds of software engineers over years, the source tree repository may eventually grow quite large—e.g., it may include tens of thousands of files organized as sub-trees of arbitrary depth with respect to the root node 204. In the depicted example, values 208A-208D of five example metrics are shown for each of the four sub-trees 1.2.1, 1.2.2, 2.2.1 and 2.2.2. The first metric ("Files") indicates the total number of source code files in the sub-tree, while the second metric ("Lines-of-code") indicates the total number of lines of code in the source code files of the sub-tree. The third metric ("Policy violations") indicates the number of potential quality policy violations that may be identified during a given iteration of analysis of the source tree on 12/13/2014 (or would be identified if the analysis were performed). The "Last e-mail" metric indicates when the most recent e-mail message pertaining to (e.g., indicating the sub-tree as the subject of the e-mail) was issued, as of the time that the policy violation detection iteration was implemented. The "Last check-in" metric indicates the timing of the most recent source code modification applied to the source tree. In at least some embodiments, the illustrated check-in and e-mail metrics may be obtainable from respective metadata sources (e.g., from an e-mail service and/or from the repository's check-in database) by collecting and/or aggregating metadata for the individual source files of the sub-trees.

In at least some embodiments, a QCV responsible for checking the source tree of FIG. 2 for policy violations may be able to prioritize among the sub-trees using the kinds of metadata metrics shown. For example, the changes and e-mails associated with sub-tree 1.2.1 occurred fairly recently with respect to the time of violation detection (12/13/2014), so it would appear that the source code of sub-tree is actively under development or in-use, and therefore should probably be assigned a high priority with respect to quality policy compliance. In contrast, the source code of sub-tree 1.2.2 has not been modified for three years prior to 12/13/14, and is therefore less likely to be in active development (although additional metadata may be needed to predict or estimate whether it is in production use). The e-mail and check-in timing metadata may serve as at least partial indicators of activity levels (or recent activity levels) with respect to the source code files. Depending on the particular types of metadata metrics available, and the particular rules that the QCV is using, it may be possible for a QCV to rank all four sub-trees in order of relative importance with regard to policy violation detection, and then to perform the violation detection and/or responsive actions accordingly. Some sub-trees or source code files may remain in a source code repository for historical reasons—e.g., because no one bothered to remove them despite the cancellation of the corresponding project, or despite the deployment of an alternative solution implementing the same business problem. Such "dead" or seldom-used sub-trees may not necessarily merit the effort involved in identifying and/or responding to possible quality policy violations. In some cases, accordingly, the violation detection analysis may not even be initiated for some of the sub-trees, e.g., if the metadata is analyzed first. In at least some embodiments, similar approaches and prioritization may be performed at the file level rather than at the sub-tree level.

Artifact Quality Control Policy Elements

Figure 3:
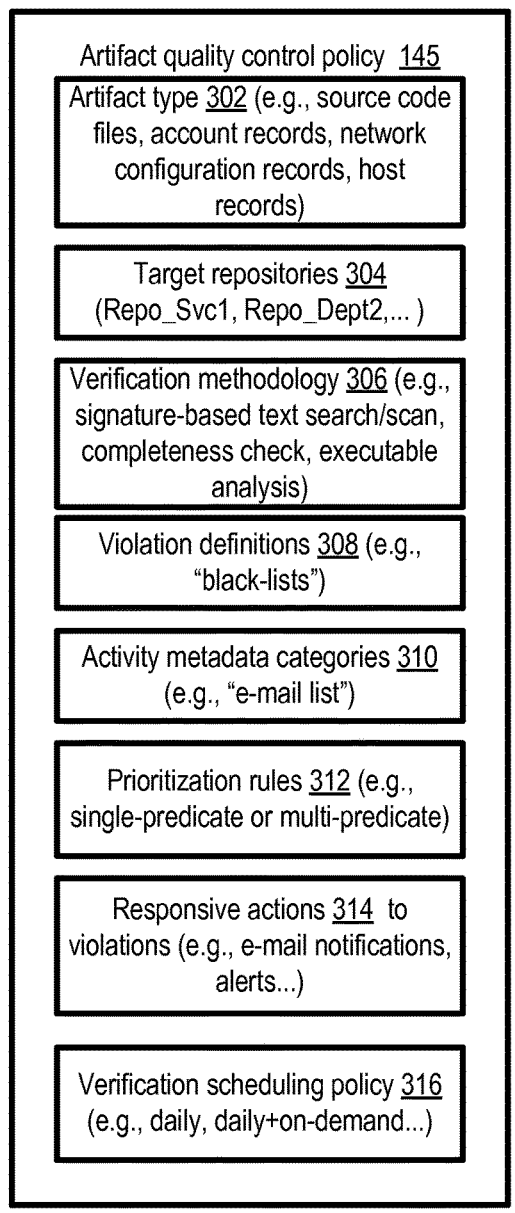
FIG. 3 illustrates example elements of an artifact quality control policy, according to at least some embodiments.

FIG. 3 illustrates example elements of an artifact quality control policy 145, according to at least some embodiments. As shown, the policy may include an indication of the artifact types 302 covered by the policy in some embodiments, such as source files, account records, host configuration records, network configuration records and the like, and the specific target repositories 304 at which the artifacts are stored. In embodiments in which the quality control policies are to be enforced at a provider network, for example, some of the repositories may be associated with respective network-accessible services, while others may be associated with respective organizational units such as departments.

Some policies may include indications of the methodology or methodologies 306 to be used to verify compliance, e.g., signature-based text scanning of the artifacts, completeness analysis to ensure that valid values are stored in various fields/elements of the artifacts, byte-code or executable analysis, and so on. In one implementation, for example, a list of tokens or text elements may be designated as indications of policy violation, and the scanning engine used by a QCV may search for the presence of such tokens. Such lists may represent one example of violation definitions 308 which may be included in the elements of the policy 145 in some embodiments. Other types of violation definitions, such as non-compliance with source code structure, missing values of one or more required elements, and so on, may be indicated in a policy 145 in various embodiments.

In some embodiments, indications of one or metadata categories 310 that can be used to prioritize the violation detection and/or responses may be included in the policy 145. A set of specific single-predicate and/or multi-predicate rules 312 which can be used to prioritize the detections and/or responses may be provided as part of a policy 145 in at least one embodiment. The actions 314 to be implemented in response to a detection of an apparent violation (e.g., whether additional automated analysis should be scheduled, an administrator should be notified via e-mail, the violating artifact should be placed in a "quarantine" or to-be-removed container, or the violating artifact should be removed from its repository) may also be indicated within a policy 145 in the depicted embodiment. In one embodiment, a scheduling policy 316 to be used to determine when various violation detection iterations should or can be scheduled may also be stored as part of the policy 145. It is noted that not all the different types of constituent elements shown in FIG. 3 may necessarily be included in any given policy in some embodiments, while other types of elements may be included in at least some policies in different embodiments.

Metadata Categories

Figure 4:
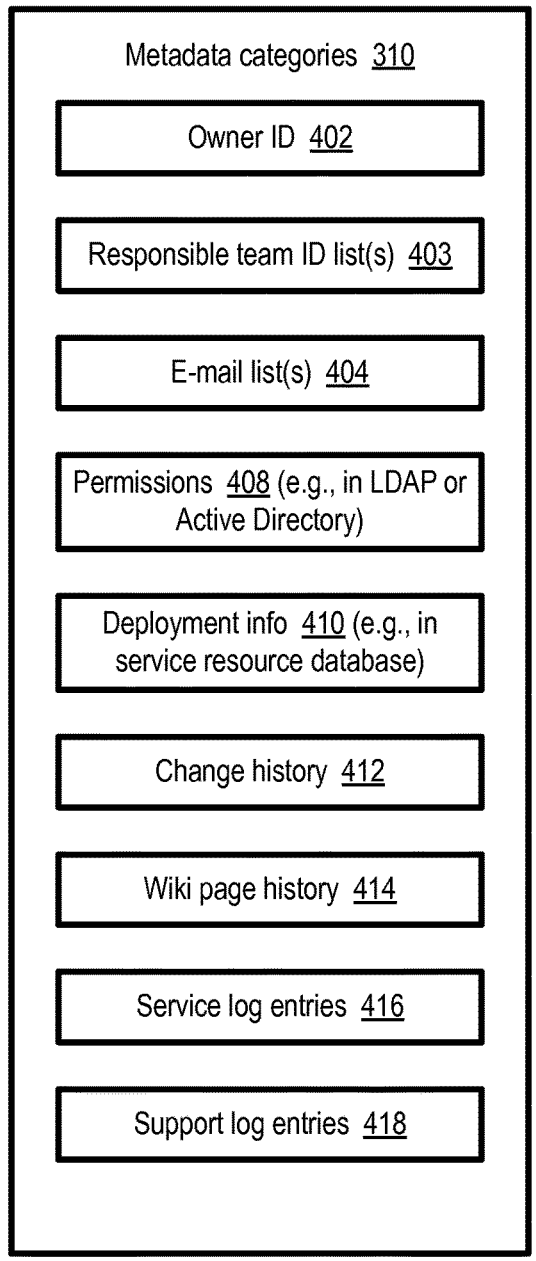
FIG. 4 illustrates example of metadata categories that may be useful in prioritizing quality policy enforcement operations and/or responses to policy violations, according to at least some embodiments.

FIG. 4 illustrates example of metadata categories 310 that may be useful in prioritizing quality policy enforcement operations and/or responses to policy violations, according to at least some embodiments. Metadata indicating an individual artifact owner (such as owner ID 402) or groups/lists 403 of individuals or entities that are collectively responsible for developing or maintaining the artifact may be used to determine whether an artifact is in production use or is currently being developed in some embodiments. For example, the owner ID or responsible team members IDs may be looked up in an employee database to determine whether they are still employees of the enterprise, or their departmental affiliations may be checked to see if they still belong to an organizational unit that may be actively utilizing the artifact.

In at least some embodiments, one or more e-mail lists 404 may be associated with an artifact or a group of artifacts, e.g., indicative of a group of employees that may be interested in the progress and deployment of the artifact. The membership of the e-mail lists may be checked in a similar way as the owner ID or responsible team IDs to ascertain the activity level of an artifact. In addition, in at least some embodiments, the time that has elapsed since e-mails were sent to such e-mail lists may provide a clue regarding the status and recent use of the artifact.

A set of permissions 408 (such as read, write or execute permissions) may be set up for various artifacts in some embodiments, and records of such permissions may be maintained in an LDAP (Lightweight Directory Access Protocol) database or an Active Directory database. The time that has elapsed since such permission records were accessed or modified may indicate the utilization status of the corresponding artifacts in such embodiments. If such permission records do not exist, or have not been read/written for a long time, this may indicate that the artifact is not being used actively.

For artifacts such as source code or packages which can be deployed in the form of executable modules, in some embodiments deployment information 410 identifying for example the set of servers or other resources at which the artifacts are being executed may be available. The existence of deployment records indicating resources that are known to be in production use may represent relatively clear-cut indications of the high importance of responding to quality policy violations detected in the corresponding artifacts.

For many types of artifacts, change history metadata entries 412 (e.g., a set of one or more modification timestamps or read timestamps) may be available to a QCV, which can provide straightforward indications of the current activity level associated with the artifacts. Some organizations may utilize internal information-sharing documents, e.g., in the form of wiki pages, associated with various projects and artifacts. Associated wiki page history records 414 that indicate timings of at least some write and/or operations performed on the wiki pages may also be useful indicators of the extent of usage of the corresponding artifacts. For those artifacts that are intended to be used to implement a service for which usage logs (such as web server logs for services accessible via web services interfaces) are kept, the service log entries 416 may sometimes provide useful indications of recent uses of the artifacts. For example, a service log record may indicate that a module "Mod1" was executed at a time T1, which may enable a QCV to deduce when the source code containing module Mod1 was last used. Similarly, technical support log entries 418 (e.g., records of defect reports and/or the resolution of customer-reported problems) may also provide hints regarding the usage of various artifacts in some embodiments. Not all the categories of metadata shown in FIG. 4 may necessarily be available for any given type of artifact in some embodiments. Furthermore, in at least some embodiments, even if some artifacts at a repository have entries of a given metadata category, other artifacts of the same repository need not necessarily have entries for that category available. Thus, a QCV may have to enforce quality policy compliance using incomplete metadata in at least some cases. A number of other types of artifact metadata in addition to the categories shown in FIG. 4 may be available in some embodiments.

Alternative Workflows for Quality Policy Enforcement

Figure 5:
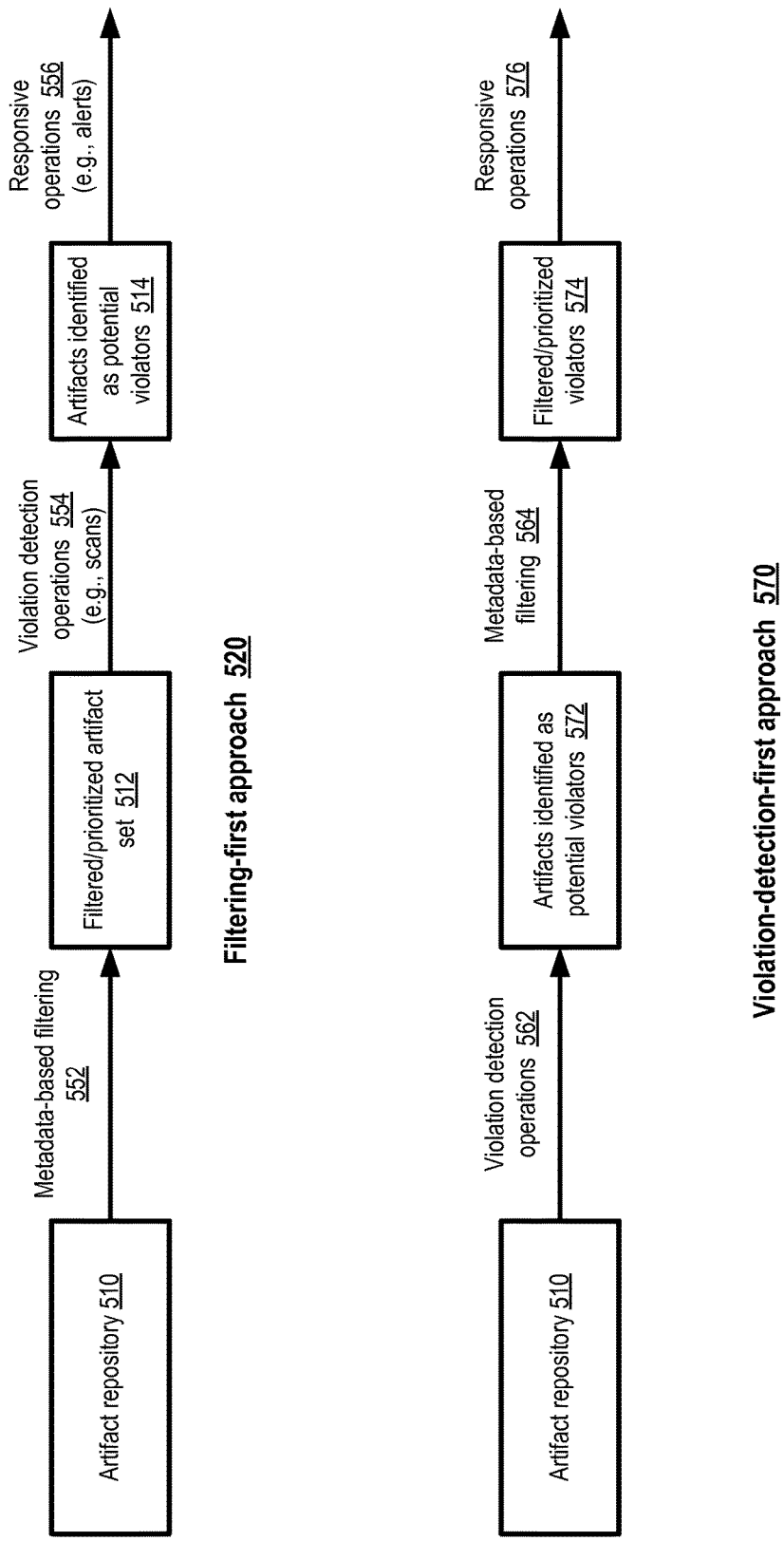
FIG. 5 illustrates examples of alternative workflows that may be used to implement optimized quality policy enforcement for artifacts, according to at least some embodiments.

As discussed earlier, the order in which metadata analysis is performed, relative to the policy violation detection operations, may differ in various embodiments. FIG. 5 illustrates examples of alternative workflows that may be used to implement optimized quality policy enforcement for artifacts, according to at least some embodiments. In the filtering-first approach 520, metadata-based filtering operations 552 may first be applied to an artifact repository 510, and as a result a filtered or prioritized set 512 of the artifacts (which may be smaller than the original population of the artifact repository) may be obtained. The PVDOs 554 (e.g., text scans, completeness checks, etc.) may then be applied to the set 512 instead of to the complete population of the repository directly, to identify artifacts that may be potential violators 514 of the quality control policies being enforced. Responsive operations 516 may then be applied for some or all of the identified violators. In some cases, the responsive actions 516 may also be implemented in order of metadata-based priorities assigned to the corresponding PVDOs or artifacts.

In an alternative approach, which may be termed the violation-detection-first approach 570, all the artifacts 510 of the repository may first be checked for policy violations as indicated by arrow 562. Then, in a second step, the subset of artifacts 572 identified as possible violators may be prioritized based on metadata-based filtering 564. In the final step, response actions 576 may be implemented on the prioritized/filtered violators 574, e.g., in priority order. The selection of the particular workflow to be used for a particular repository or a particular iteration of policy enforcement operations may be based on a variety of factors in different embodiments. For example, in one embodiment, the costs of obtaining and/or analyzing the metadata may be weighed against the costs of performing the PVDOs. If the metadata analysis is complex and the violation detection is relatively simple, and if the number of artifacts is not too large, the violation-detection-first approach may be used; otherwise, the filtering-first approach may be employed.

Web-Based Interface for Generating Prioritization Rules

Figure 6:
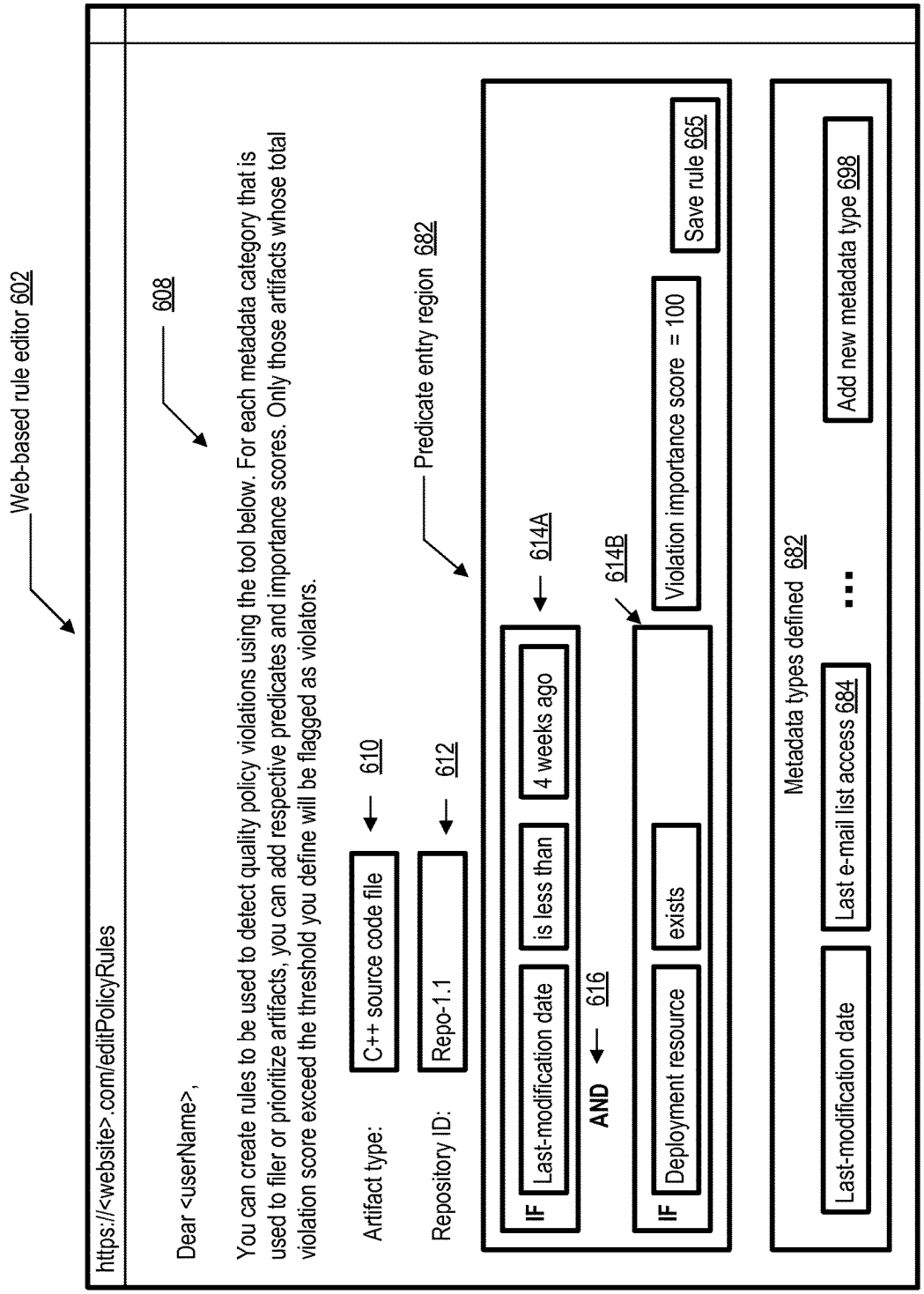
FIG. 6 illustrates an example of a web-based programmatic interface that may be used to generate metadata-based rules for quality policy enforcement, according to at least some embodiments.

In some embodiments, as mentioned earlier, users of the quality policy enforcement system may be able to generate rules that can be used to prioritize PVDOs. FIG. 6 illustrates an example of a web-based programmatic interface that may be used to generate metadata-based rules for quality policy enforcement, according to at least some embodiments. As shown, a web page representing a rule editor 602 may be implemented and made accessible to authorized users such as system administrators, departmental managers and the like. The rule editor interface may include, for example, a message area 608 providing a high level overview of the tool.

In the depicted example, a user may select an artifact type using a drop-down menu 610, and indicate one or more target repositories by providing a repository identifier 612. In predicate entry region 682, the user may indicate various Boolean combinations of conditions or predicates that each apply to one or more metadata categories selected from a pre-populated metadata types region 682. Users may add metadata categories by clicking on button 698 in the depicted interface. In the example shown, two predicates 614A and 614B have thus far been defined for a rule to be applied to C++ source file artifacts of a repository "Repo-1.1". In the first predicate 614A, the metadata category is "Last-modification-date". If the last modification date of an artifact is less than two weeks old, the first predicate 614A may be set to "true". The second predicate 614B may be set to true if a deployment resource metadata entry exists for the artifact being evaluated (e.g., indicating that an executable version of the C++ file is being run at some server being used in a production environment). If both predicates are "true" for an artifact (as indicated by the AND link 616), the violation importance score for the artifact is set to 100 in the depicted example. The user may save the rule being edited using button 665 in the depicted embodiment. In some embodiments, aggregate importance scores may be obtained from the respective individual importance scores assigned to each predicate, or respective importance scores may be obtained for a plurality of different rules and then combined or aggregated. A number of different mathematical functions may be used for the aggregation in different implementations, e.g., based on user preference or the QCV's heuristics, such as obtaining a mean importance score, a summed aggregate score, and so on. Such aggregated scores may be used to prioritize PVDOs and/or responses to detected violations in various embodiments.

Quality Policy Enforcement Tradeoffs

Figure 7:
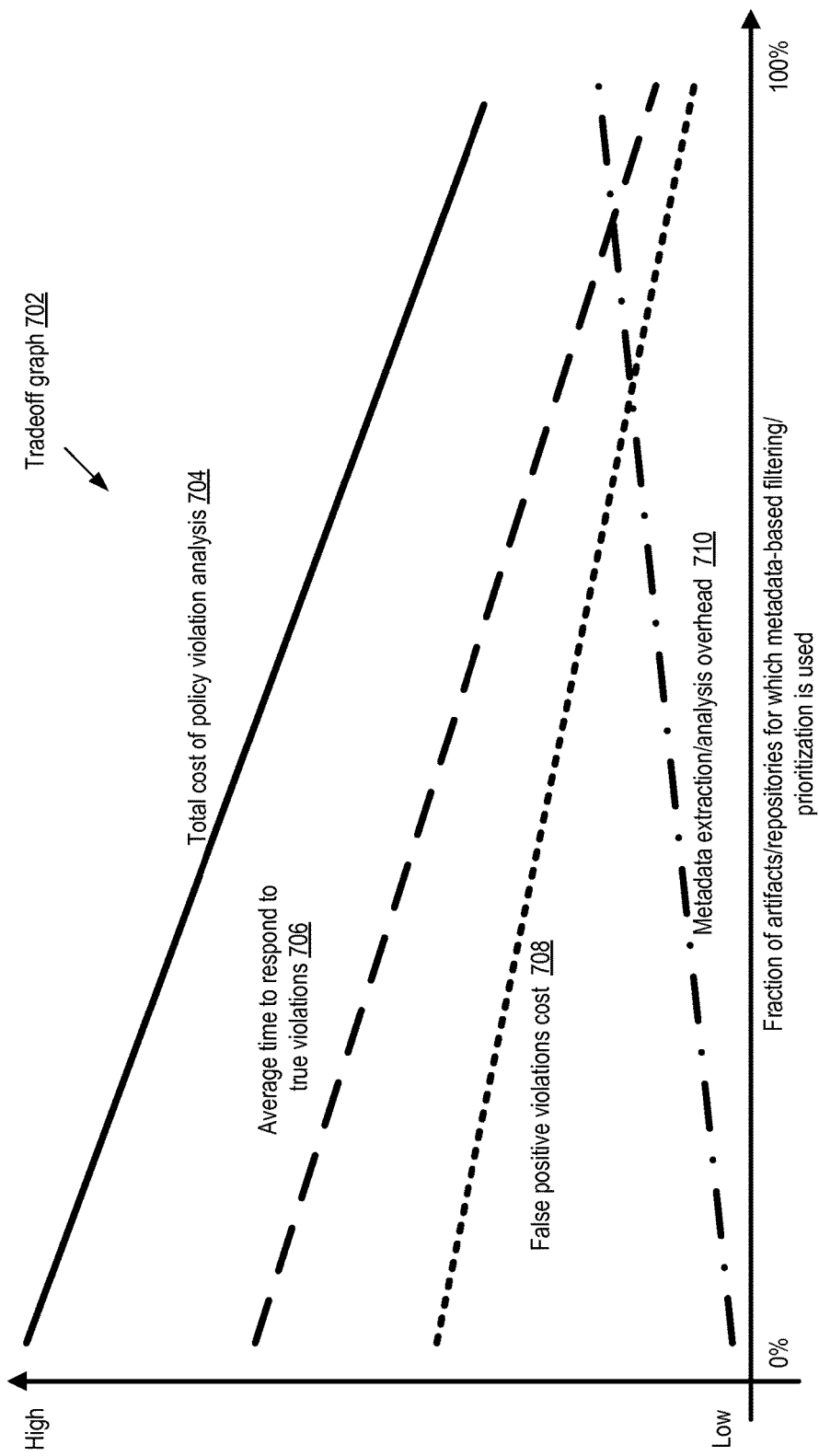
FIG. 7 illustrates examples of tradeoffs associated with using metadata for artifact quality policy enforcement, according to at least some embodiments.

As mentioned earlier, using artifact metadata to guide the operations required for detecting and/or responding to quality policy violations may involve tradeoffs in various embodiments, e.g., depending on the effort and cost of retrieving and analyzing the metadata. FIG. 7 illustrates examples of tradeoffs associated with using metadata for artifact quality policy enforcement, according to at least some embodiments. It is noted that the curves shown in FIG. 7 are intended to show broad qualitative relationships between various metrics associated with quality policies, and do not necessarily represent any specific measurements.

On the X-axis of the tradeoff graph 702, the fraction of the artifacts/repositories at which metadata-based prioritization or filtering of the kind described above is used within a given enterprise network or provider network increases from left to right, with 0 percent at the intersection with the Y axis and 100% at the right end. Four curves indicating the trends that may be observed in respective metrics are shown. The total cost of policy violation analysis decreases as the fraction of metadata use increases, and is represented by curve 704. The cost may be measured using a variety of units, such as CPU or processing costs associated with the execution of one or more quality compliance verifiers, the networking and/or storage resources used, and the like. The cost associated with false positive violation detections may also generally decrease as metadata use goes up, as indicated by curve 708. A false positive could, for example, represent a scenario in which the violation detection mechanism incorrectly identifies a given artifact as a violator. Such incorrect identifications may occur, for example, if the definition of a violation is ambiguous, or if the interpretation of a violation definition is at least somewhat subjective. A different type of false positive could represent a scenario in which a violation is correctly identified within an artifact, but the artifact is not in current use. As a consequence of the fact that the violating artifact is not being used, the existence of the violation may not represent a vulnerability or have any significant negative impact on the enterprise. As the use of metadata increases, the time spent on less important (or non-consequential) policy violations such as false positives may decrease. As a result, the average time to respond to or resolve true violations (i.e., violations that are not false positives) may generally decrease, as indicated by curve 706.

In at least some embodiments, as indicated by curve 701, the costs of obtaining/extracting and analyzing the metadata may increase as the fraction of artifacts for which policy violations are handled using the techniques described above increases. In some embodiments, the metadata may be collected using background or low-priority processes, e.g., asynchronously with respect to the policy violation detections, so that the overhead of obtaining the metadata is reduced. In some embodiments, the quality compliance service may keep track of the costs incurred with respect to metadata extraction and analysis over time for a given repository and a given set of violation definitions, and may adjust the extent to which metadata-based analysis is implemented based on a cost-benefit analysis. In at least one embodiment, machine learning techniques may be used to determine the types of metadata that provide the largest benefit for quality policy enforcement at the lowest cost, and the QCVs may modify their operations based on the machine learning based recommendations.

Methods of Metadata-Guided Optimization of Quality Policy Enforcement

Figure 8:
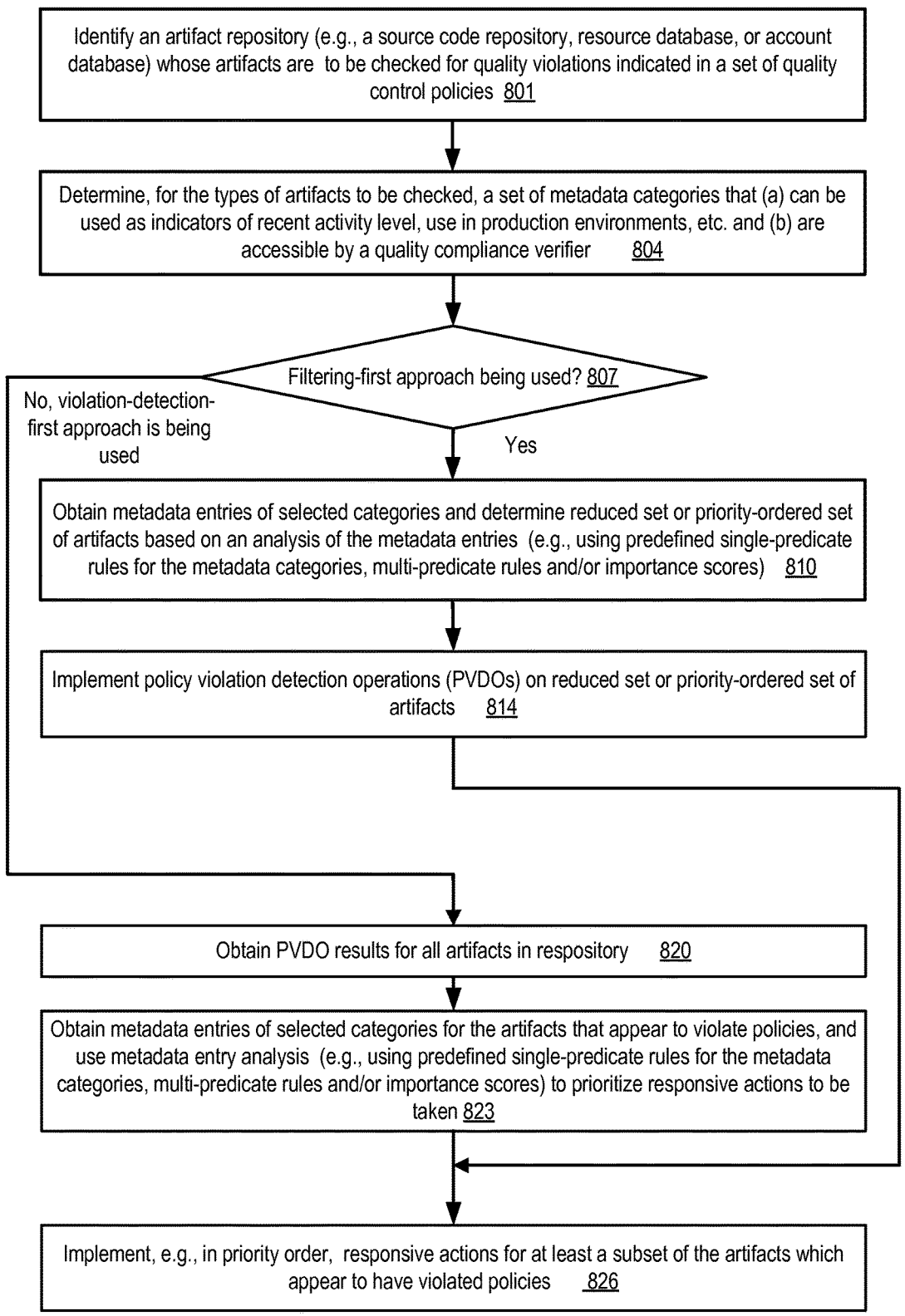
FIG. 8 is a flow diagram illustrating aspects of operations that may be performed to implement metadata-guided enforcement of artifact quality policies, according to at least some embodiments.

FIG. 8 is a flow diagram illustrating aspects of operations that may be performed to implement metadata-guided enforcement of artifact quality policies, according to at least some embodiments. As shown in element 801, one or more artifact repositories of a network (e.g., a provider network or some other type of enterprise network) may be identified as targets of artifact quality policy violation detection operations. The violations to be checked may be indicated in one or more quality control policies in some embodiments. Any of a wide variety of types of artifacts/repositories may be selected for violation detection, such as various source code repositories, resource databases such as host databases with entries concerning various computer hosts or servers, account databases, network configuration databases, and the like. Similarly, any various types of defects may be targeted for detection, such as the use of obsolete or potentially vulnerable source code, incomplete records, and the like.

Corresponding to the types of artifacts to be checked within a particular repository, one or more categories of metadata that may be helpful in prioritizing/filtering the quality policy enforcement operations may be identified in the depicted embodiment (element 804). The metadata entries corresponding to the identified metadata categories may have to meet at least two criteria in some embodiments: (a) they may have to be accessible (e.g., either via direct programmatic interactions, or via some set of intermediary entities) to the quality compliance verifier(s) being used, and (b) they may have to be indicative of recent activity level (which may also be referred to as the activity status) of the artifacts. Some of the metadata, such as references to the specific hardware hosts or servers at which an executable version of a source code file has been deployed, may indicate that an artifact is being used currently in a production environment, for example. Other metadata (such as e-mail lists and the like) may at least indicate that an artifact is in current use for development purposes, and is not part of an abandoned or canceled project. In at least some implementations, one or more of the categories of metadata used by the verifiers may provide hints or subjective/probabilistic indications of the activity status of the artifacts, rather than definitive evidence of recent activity.

One of at least two approaches may be used during a given iteration of quality policy enforcement operations at a given repository in the depicted embodiment: a filtering-first approach, or a violation-detection-first approach. The choice of the approach may be based, for example, on configuration settings of the quality compliance verifier(s) being used, or may be determined dynamically based on input from machine learning modules and the like in different embodiments. If the filtering-first approach is used (as determined in element 807), metadata of selected categories may be obtained for at least a subset of the artifacts in the repository (element 810). The metadata may then be used to determine a reduced set or a prioritized set of artifacts, e.g., using a set of single-predicate or multi-predicate rules defined in terms of metadata values or ranges of the kinds described above. In some embodiments, various rules and/or metadata categories may be assigned respective importance values, and the values may be used to determine the prioritized or reduced set of artifacts. Importance values or scores corresponding to different rules or different categories may be combined to obtain aggregated scores that may be used for prioritization in some implementations. The appropriate policy violation detection operations (PVDOs) may then be implemented, e.g., in priority order, on the reduced or prioritized set of artifacts (element 813) in the depicted embodiment. If any of the artifacts appear to violate the quality policy or policies being enforced, the appropriate responsive actions (such as notifications/alerts targeted at administrators, or quarantining/removal of the violating artifact from the repository) may be taken (element 826). In at least one embodiment, one entity (such as a quality compliance verifier) may be responsible for analyzing the metadata of a given set of artifacts for prioritization purposes, while another entity may be responsible for actually implementing the PVDOs and/or for taking responsive actions. Similarly, in some embodiments, the PVDOs may be performed by a different entity that the entity that takes the actions responsive to detected policy violations. In general, the responsibilities for (a) metadata extraction and analysis, (b) PVDO execution, and (c) responsive actions may be distributed as desired among one or more entities.

If the violation-detection-first approach is used (as also determined in element 807), in at least some embodiments the PVDOs may be implemented on all the artifacts within the repository (element 820). After potential violators have been identified, metadata of the selected categories pertaining to the potential violators may be obtained (element 823). The metadata may be used (e.g., in accordance with single-predicate rules, multi-predicate rules, and/or importance factors) to prioritize the responses to the detected violations relative to one another, and the responsive actions may then be implemented (element 826). In some embodiments, based on the prioritization, responsive actions may only be performed on a subset of artifacts to whose violations higher priorities have been assigned. In at least one embodiment, a number of different responsive actions may be available for a given type of violation, and a different responsive action may be taken in response to a high-priority violation than is taken in response to a low-priority violation. For example, consider a scenario in which the metadata associated with a source code file F1 indicates that a response to a violation in F1 should be granted high priority (because F1's code is very likely being used in production), while the metadata for source file F2 indicates that a response to a violation in F2 is to be granted low priority (because F2's code is not being used in production). In violations are detected in F1 and F2, a different set of responses may be taken with respect to F1 (e.g., a high-level alert may be sent to an administrator, or F1 may be quarantined) than with respect to F2 (e.g., a lower-level alert or log message may be generated) in some embodiments.

It is noted that in various embodiments, operations other than those illustrated in the flow diagrams of FIG. 8 may be used to implement at least some of the techniques for supporting metadata-based quality policy enforcement discussed herein. Some of the operations shown may not be implemented in some embodiments, may be implemented in a different order than illustrated in FIG. 8, or in parallel rather than sequentially.

Use Cases

The techniques described above, of utilizing artifact metadata to prioritize or guide the enforcement of quality control policies may be useful in a variety of scenarios. In some large enterprise networks, especially in provider network environments, numerous types of artifacts may be generated at a very high rate, e.g., by different software development teams, configuration management teams for different services being implemented for internal or external customers, and so on. Over time, the repositories containing the artifacts may grow to include millions of artifacts, at least some of which may no longer be in active use. Various types of contextual metadata, such as e-mail lists, last-modification timestamps, deployment resource records, and the like may be available that can be used to predict or determine whether the artifacts are being used. A quality verification service may be able to utilize the available metadata in an automated fashion to reduce the amount of processing and/or other resources that are required to enforce various quality control policies of the organization. Such metadata-based filtering may not only reduce the resources that may otherwise be wasted with respect to false positive policy violations, but they may also lead to greater buy-in for the quality policy enforcement from various parts of the enterprise organization.

Illustrative Computer System

Figure 9:
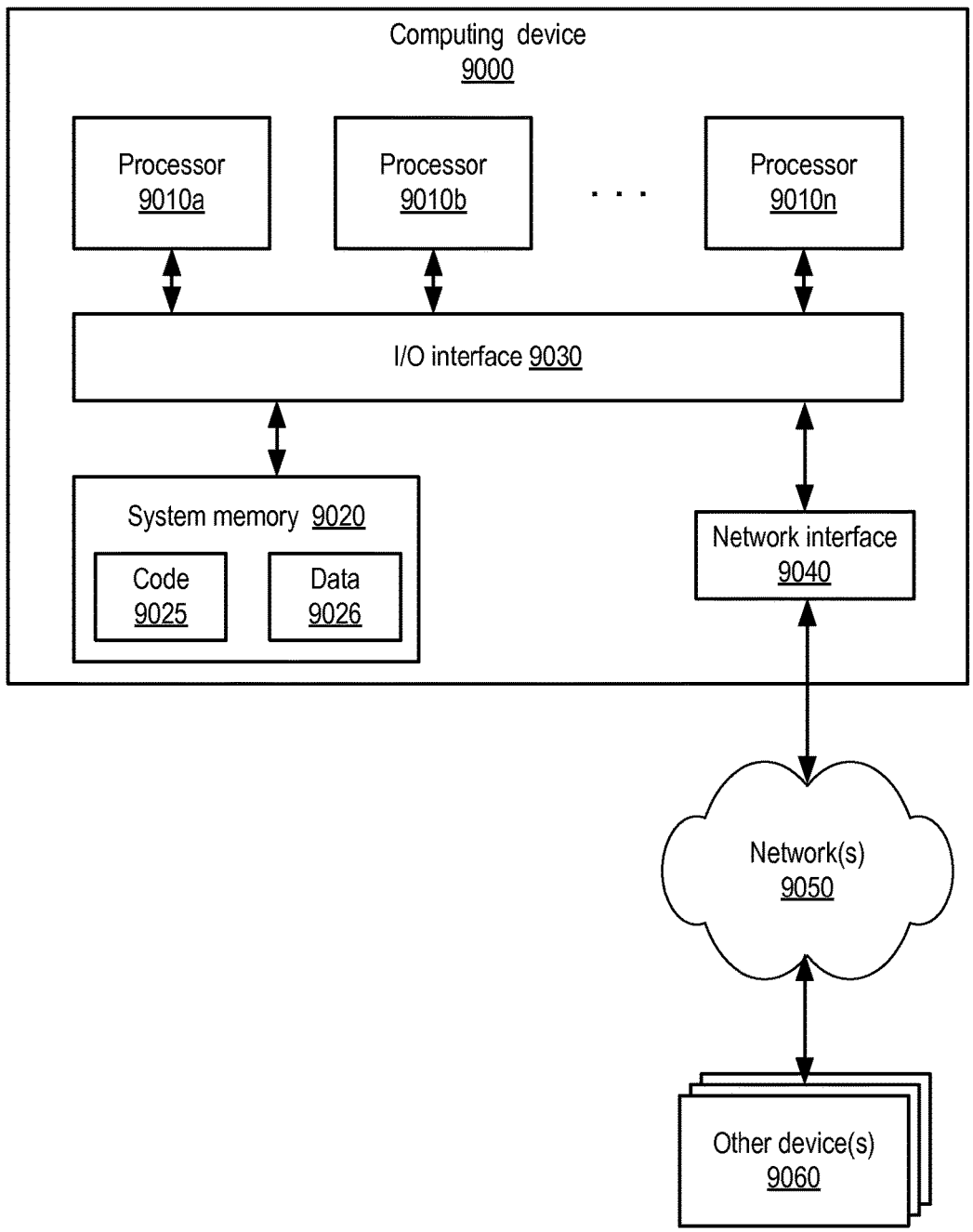
FIG. 9 is a block diagram illustrating an example computing device that may be used in at least some embodiments.

In at least some embodiments, a server that implements one or more of the techniques described above for supporting metadata-based verification of artifact quality compliance may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    one or more artifact repositories of a provider network, including a first repository comprising source code files of a particular service implemented at the provider network; and
    one or more computing devices of a quality compliance verifier (QCV);
    wherein the QCV is configured to:
        identify a set of quality control policies (QCPs) to be implemented for artifacts stored in the first repository, including a particular QCP;
        determine one or more metadata categories, such that respective metadata entries of at least a particular metadata category of the one or more metadata categories are accessible to the QCV with respect to at least a subset of the artifacts stored in the first repository, wherein a metadata entry of the particular metadata category indicates an activity status of a corresponding artifact;
        obtain a plurality of metadata entries of the particular metadata category, including a first metadata entry corresponding to a first artifact of the first repository and a second metadata entry corresponding to a second artifact of the first repository;
        assign, based at least in part on an analysis of the first metadata entry and the second metadata entry, a first priority to a first policy violation detection operation (PVDO) directed to the first artifact, and a lower priority to a second PVDO directed to the second artifact, wherein the first and second PVDOs are associated with the particular QCP; and based at least in part on a result of the first PVDO, initiate one or more responsive actions to a detection of a violation of the particular QCP.

2. The system as recited in claim 1, wherein the QCV is configured to:
determine, based at least in part on the lower priority, not to implement the second PVDO.

3. The system as recited in claim 1, wherein to implement the first PVDO, the QCV is configured to:
determine, using a scan operation, whether the first artifact includes one or more elements included in a predetermined list of violations of the particular QCP.

4. The system as recited in claim 1, wherein the QCV is configured to identify a second set of quality control policies to be implemented for a second artifact repository of the one or more artifact repositories, wherein a different artifact stored in the second artifact repository comprises one of: (a) an entry in an account database, (b) an entry in a networking configuration database, or (c) an entry in a host database of a provider network.

5. The system as recited in claim 1, wherein the one or more metadata categories include metadata comprising one of: (a) artifact owner identification, (b) affiliated team membership, (c) a notification e-mail address list, (d) an access permission, (e) deployment information indicating one or more resources at which an artifact is being used to implement an operation, (f) change history, (g) a list of wiki pages, or (h) a service log of a service at which an artifact is being used.

6. A method, comprising:
identifying, by an automated quality compliance verifier (QCV) implementing using one or more computing devices, a set of quality control policies (QCPs), including a particular QCP to be enforced for artifacts stored in one or more repositories including a first repository;
determining, by the automated QCV, one or more metadata categories, such that respective metadata entries of at least a particular metadata category of the one or more metadata categories are accessible to the QCV with respect to at least a subset of the artifacts stored in the first repository;
assigning, by the automated QCV, based at least in part on an analysis of a first metadata entry and a second metadata entry of the particular metadata category, wherein the first metadata entry corresponds to a first artifact of the repository and the second metadata entry corresponds to a second artifact of the repository, a first priority to a first policy violation detection operation (PVDO) directed to the first artifact, and a lower priority to a second PVDO directed to the second artifact, wherein the first and second PVDOs are associated with the particular QCP; and
initiating, by the automated QCV, one or more responsive actions based at least in part on the result of the first PVDO.

7. The method as recited in claim 6, further comprising:
determining, by the automated QCV, based at least in part on the lower priority, not to implement the second PVDO.

8. The method as recited in claim 6, wherein the first PVDO comprises determining, using a scan operation, whether the first artifact includes one or more elements included in a predetermined list of violations of the particular QCP.

9. The method as recited in claim 6, wherein the one or more metadata categories include metadata comprising one of: (a) artifact owner identification, (b) affiliated team membership, (c) a notification e-mail address list, (d) an access permission, (e) deployment information indicating one or more resources at which an artifact is being used to implement an operation, (f) change history, (g) a list of wiki pages, or (h) a service log of a service at which an artifact is being used.

10. The method as recited in claim 6, wherein said assigning the first priority to the first PVDO is based at least in part on a multi-predicate rule, wherein the multi-predicate rule includes a first predicate corresponding to the particular metadata category and a second predicate corresponding to a different metadata category.

11. The method as recited in claim 6, wherein said assigning the first priority to the first PVDO is based at least in part on determining an aggregated importance score of the first artifact, wherein the aggregated importance score is obtained using a first importance score associated with metadata of the particular metadata category and a second importance score associated with metadata of a different metadata category.

12. The method as recited in claim 6, further comprising:
receiving, by the automated QCV, an indication of a triggering event indicative of potential violations of a different QCP; and
initiating, by the automated QCV, an iteration of PVDOs in response to said receiving.

13. The method as recited in claim 6, wherein the first PVDO is scheduled as part of a software build operation.

14. The method as recited in claim 6, wherein the first artifact comprises one of: (a) source code for a software program (b) an entry in an account database (c) an entry in a networking configuration database (d) an entry in a host database of a provider network.

15. The method as recited in claim 6, wherein the one or more responsive actions comprises (a) generation of a request to remove the first artifact from the first repository; or (b) a transmission of a warning message.

16. A non-transitory computer-accessible storage medium storing program instructions that when executed on one or more processors implements a quality compliance verifier (QCV) affiliated with one or more artifact repositories, wherein the QCV is configured to:
identify a set of quality control policies (QCPs), including a particular QCP to be enforced for artifacts stored in a first repository of the one or more artifact repositories;
determine one or more metadata categories, such that respective metadata entries of at least a particular metadata category of the one or more metadata categories are accessible to the QCV with respect to at least a subset of the artifacts stored in the first repository;
assign, based at least in part on an analysis of a first metadata entry and a second metadata entry of the particular metadata category, wherein the first metadata entry corresponds to a first artifact of the repository and the second metadata entry corresponds to a second artifact of the repository, a first priority to a first policy violation detection operation (PVDO) directed to the first artifact, and a second priority to a second PVDO directed to the second artifact, wherein the first and second PVDOs are associated with the particular QCP.

17. The non-transitory computer-accessible storage medium as recited in claim 16, wherein the QCV is configured to:
- initiate, based at least in part on the first priority, the first PVDO; and
- determine, based at least in part on the second priority, not to implement the second PVDO.

18. The non-transitory computer-accessible storage medium as recited in claim 16, wherein the first PVDO comprises a determination, using a scan operation, of whether the first artifact includes one or more elements included in a predetermined list of violations of the particular QCP.

19. The non-transitory computer-accessible storage medium as recited in claim 16, wherein the one or more metadata categories include metadata comprising one of: (a) artifact owner identification, (b) affiliated team membership, (c) a notification e-mail address list, (d) an access permission, (e) deployment information indicating one or more resources at which an artifact is being used to implement an operation, (f) change history, (g) a list of wiki pages, or (h) a service log of a service at which an artifact is being used.

20. The non-transitory computer-accessible storage medium as recited in claim 16, wherein the QCV is configured to assign the first priority to the first PVDO based at least in part on a multi-predicate rule, wherein the multi-predicate rule includes a first predicate corresponding to the particular metadata category and a second predicate corresponding to a different metadata category.

* * * * *